US010186139B2

(12) United States Patent
Shoari et al.

(10) Patent No.: US 10,186,139 B2
(45) Date of Patent: Jan. 22, 2019

(54) APPARATUS AND METHODS TO PROMOTE SUSTAINABLE BEHAVIOR AMONG SMARTPHONE USERS

(71) Applicants: Arian Shoari, Rochester, NY (US); Mona Komeijani, Rochester, NY (US)

(72) Inventors: Arian Shoari, Rochester, NY (US); Mona Komeijani, Rochester, NY (US)

( * ) Notice: Subject to any disclaimer, the term of this patent is extended or adjusted under 35 U.S.C. 154(b) by 0 days.

(21) Appl. No.: 15/396,493

(22) Filed: Dec. 31, 2016

(65) Prior Publication Data

US 2017/0263105 A1    Sep. 14, 2017

Related U.S. Application Data

(60) Provisional application No. 62/304,944, filed on Mar. 8, 2016, provisional application No. 62/321,906, filed on Apr. 13, 2016.

(51) Int. Cl.
*H04W 4/00* (2018.01)
*G08B 21/24* (2006.01)
(Continued)

(52) U.S. Cl.
CPC ............ *G08B 21/24* (2013.01); *G06F 1/203* (2013.01); *G08B 21/0247* (2013.01); *H04B 17/23* (2015.01); *H04B 17/27* (2015.01); *H04B 17/318* (2015.01); *H04M 1/0202* (2013.01); *H04M 1/0262* (2013.01); *H04M 1/7253* (2013.01); *H04W 4/023* (2013.01); *H04M 2250/12* (2013.01)

(58) Field of Classification Search
CPC .. H04W 4/023; H04M 1/0202; G08B 21/182; G08B 21/24; H04B 17/318; H04B 17/23
See application file for complete search history.

(56) References Cited

U.S. PATENT DOCUMENTS 6,342,847 B1   1/2002   Archuleta et al.
9,167,381 B2   10/2015  McDonald
(Continued)

OTHER PUBLICATIONS

Mona Komeijani et al., Bridging the Gap between Eco-Design and the Human Thinking System, Challenges Journal, Mar. 10, 2016, vol. 7, No. 1, publisher: MDPI (Multidisciplinary Digital Publishing Institute), city: Basel, country: Switzerland, web : http://www.mdpl.com/2076-1547/7/1/5.

*Primary Examiner* — William Nealon

(57) ABSTRACT

This disclosure describes methods and apparatus to promote sustainable usage of smartphones such as preventing phone loss, preventing overheating and overcharging, and decreasing packaging waste. A method and apparatus to prevent phone loss is disclosed. Radio frequency beacons (or tags) attached to the owner transmit signals to the smartphone. The distance of the owner from the smartphone is estimated based on the quality of the received radio frequency signals in the smartphone. The system alerts user whenever the distance gets farther than a preset value. A method and apparatus to prevent overcharging of the battery is also disclosed. A plugging mechanism is presented that will be automatically detached from the smart phone when the battery is fully charged. Moreover, an alerting system is disclosed that alerts the user to stop using the device when the internal temperature of the device gets hotter than a preset threshold.

11 Claims, 17 Drawing Sheets

(51) Int. Cl.
*H04W 4/02* (2018.01)
*H04B 17/318* (2015.01)
*H04B 17/23* (2015.01)
*H04M 1/02* (2006.01)
*G06F 1/20* (2006.01)
*G08B 21/02* (2006.01)
*H04M 1/725* (2006.01)
*H04B 17/27* (2015.01)

(56) References Cited

U.S. PATENT DOCUMENTS

| | | | |
|---|---|---|---|
| 9,187,381 | B1 | 11/2015 | McDonald |
| 2001/0030603 | A1* | 10/2001 | Arens ................ G08B 13/1427 340/506 |
| 2008/0125040 | A1* | 5/2008 | Kalayjian ............... H04W 4/02 455/41.2 |
| 2009/0286548 | A1* | 11/2009 | Coronel ................. H04W 4/20 455/456.1 |
| 2011/0028093 | A1* | 2/2011 | Patel ...................... H04B 17/27 455/41.2 |
| 2012/0255505 | A1 | 10/2012 | Gauthier |
| 2012/0256505 | A1 | 10/2012 | Gauthier |
| 2014/0030982 | A1* | 1/2014 | Cardona ................... G01S 5/14 455/67.11 |
| 2014/0243011 | A1* | 8/2014 | Pan ...................... H04W 64/00 455/456.1 |
| 2015/0081474 | A1* | 3/2015 | Kostka ............... G06Q 30/0633 705/26.8 |
| 2015/0296347 | A1* | 10/2015 | Roth ...................... H04W 4/04 705/326 |

* cited by examiner

| Goal 1 | Reducing Purchase Frequency | | |
|---|---|---|---|
| Unsustainable behavior | Replaces before obsolete | Does not repair or upgrade | Buyer's remorse |
| Thinking system | Automatic | Reflective | Reflective |
| Design concept | Emotional design | Anticipatory design | Interaction design |
| Design techniques | Create attachment using feeling and memories | Physical form enables upgradability | Educate user to make better purchasing decision |
| Potential application to smartphone | Case can be customized using photos to create stronger connection with user | Modular phone allows user to upgrade or change a specific part | Packaging better comunicates product features and details to reflect their needs |

Fig. 3

| Goal 2 | Reduce Energy Consumption | | | | |
|---|---|---|---|---|---|
| Unsustainable behavior | Overcharging | Undercharging | | Overheating | |
| Thinking system | Reflective | Reflective | Automatic | Reflective | Automatic |
| Design concept | Interaction design | Interaction design | Ergonomic design | Interaction design | Ergonomic design |
| Design techniques | Notify user about energy consumption | Notify user about optimal charging | Change physical form to optimize performance | Notify user about phone temprature | Change physical form to promote cooling |
| Potential application to smartphone | Text or image notification explains monetary cost of energy usage | Prompt user to wait and not unplug the charger until the phone is fully charged | Charger requires extra step to disconnect from device when not fully charged | An alert notifies user to stop using the phone when it gets hot | Squeezable frame circulates air and cools down the battery |

Fig. 4

| Goal 3 | Reducing Physical Damage | | | | |
|---|---|---|---|---|---|
| Unsustainable behavior | Dropping the phone | Environmental stress | | Losing the phone | |
| Thinking system | Automatic | Reflective | Reflective | Reflective | Automatic |
| Design concept | Ergonomic design | Interaction design | Anticipatory design | Interaction design | Ergonomic design |
| Design techniques | Change physical form to enhance durability | Notify user about phone temperature | Integrate sensors to detect and prevent failure | Integrate sensors to prevent phone loss | Enable physical attachment with user |
| Potential application to smartphone | Shatterproof materials to prevent damage if dropped / Slip proof or easy to grip materials to prevent dropping | Text or image alerts about temperature extremes | Automatic shut down if exposed to stress (water, temperature) | Alert user when product is left behind in public places | Wristlet or lanyard accessory attaches to user |

Fig. 10

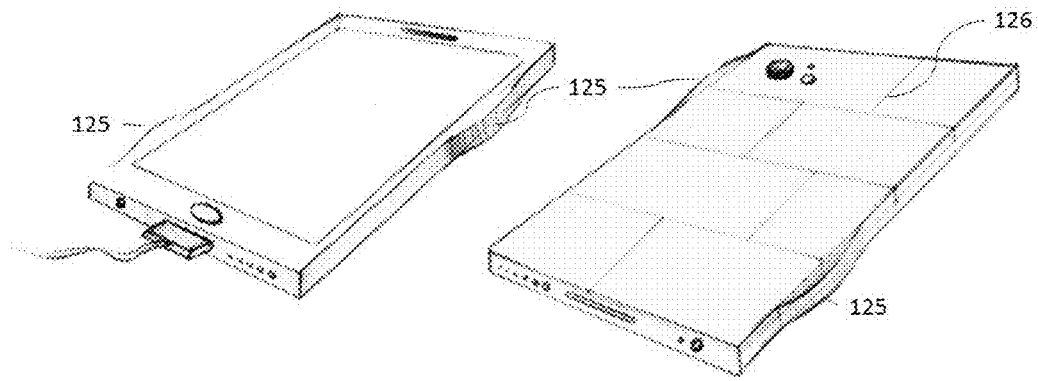

Fig. 11

| Goal 4 | Encouraging Sustainable End of Life | | |
|---|---|---|---|
| Unsustainable behavior | Does not recycle | Keep in storage | |
| Thinking system | Reflective | Reflective | Reflective |
| Design concept | Interaction design | Interaction design | Anticipatory design |
| Design techniques | Notify user about recycling options | Notify user about reuse options | Change packaging form to provide dual purpose |
| Potential application to smartphone | Text or image alert identifies recycling facilities and location and community events | Alert user of someone in need of used phone | Packaging converts to a stand during use and then to a mailer for recycling or donation |

Fig. 12

APPARATUS AND METHODS TO PROMOTE SUSTAINABLE BEHAVIOR AMONG SMARTPHONE USERS

CROSS REFERENCE TO RELATED APPLICATIONS

This application claims the benefit of U.S. Provisional Application No. 62/304,944 filed on Mar. 8, 2016, and U.S. Provisional Application No. 62/321,906 filed on Apr. 13, 2016, the contents of which are hereby incorporated by reference herein.

STATEMENT REGARDING FEDERALLY SPONSORED RESEARCH

This invention was made with government support under CBET 1236447 awarded by National Science Foundation. The government has certain rights in the invention.

COPYRIGHT NOTICE

Some parts of the disclosure of this patent application contain materials that are subject to copyright protection. The owner of the copyright has no objection to the facsimile re-production of this disclosure by anyone as it appears in the Patent and Trademark Office patent file or records, but otherwise reserves all copyright.

BACKGROUND OF THE INVENTION

Technological progress in consumer electronics comes with immense environmental costs, including extraction of scarce materials, consumption of fossil fuels, and growing e-waste challenges. Eco-design has emerged as a promising approach to reduce the environmental footprint of electronics by integrating sustainability-oriented decisions early in the product realization process. However, most approaches focus on the product itself, not on the consumer who ultimately decides how to purchase, use, maintain, and dispose of the device. Many of the relevant environmental impacts of consumer electronics occur farther upstream or downstream of the consumer, who is often unaware of the full life cycle impacts. Many mobile products, like smartphones, have significant environmental impacts associated with raw material extraction and manufacturing. While not a direct consequence of consumer behavior, these impacts are magnified by unsustainable, such as frequently replacing still working devices, which requires new products to be manufactured and additional waste to be managed.

Thus, the design of electronic parts and accessories play a key role in sustainable behavior for many types of objects such as, but not limited to, consumer electronics, appliances, and buildings. To date, except in the case of the 'Design with Intent' or 'DWI' methodology, limited guidance has been developed to help designers create a product with a reduced environmental impact. However, the DWI method is complicated and focuses on how the designer thinks rather than how the user thinks. The application of this framework does not explicitly seek to improve environmental sustainability of the product (e.g., consumers can not influence energy consumption), although that may be a potential outcome.

The heart of effective sustainable design strategies is the human thinking system: understanding how consumers think about the products with which they interact. In this application, we present here a Sustainable Behavior Design (SBD) framework to link common design concepts (ergonomic, emotional, preventative, and interaction) with core aspects of the human thinking system to create features to make users aware of their behavior and decisions (reflective thinking). Alternatively, it may be used to promote sustainable behaviors even when users are unaware (automatic thinking). The SBD framework is demonstrated using a case study on a smartphone which can be applied to tablets, pocket PCs, PDAs, laptops, or personal digital assistants. The reimagined smartphone design integrates solutions addressing both automatic and reflective thinking systems, potentially reducing life cycle impacts by almost 30%.

A group of novel designs for smartphones and their accessories and packaging is presented in this application. Managing the environmental impacts of this product has been further complicated by the rapid changes in manufacturing, consumption, ownership patterns. Therefore, slow improvements stemming from supply side design strategies are not sufficient to overcome the environmental effect of this product.

SUMMARY OF THE INVENTION

This disclosure describes novel schemes and utilities that promote sustainable usage of smartphones. It describes apparatus and methods to prevent phone loss, prevent overheating problems, decrease energy waste of the battery, prevent overcharging, decrease packaging waste, and encourage sustainable behavior among users to increase the life of the electronic product. The apparatus and methods may be applied to promote sustainable usage of other electronic devices such as tablets, laptops, pocket PCs, personal digital assistants (PDAs), e-readers, wearable devices, and etc. In addition, a framework has been presented which can be applied to promote sustainable behavior for any consumer electronics products including smartphones.

BRIEF DESCRIPTION OF THE DRAWINGS

FIG. 3: SBD framework applied to meet Goal 1 "Reducing Purchase Frequency": examples of how images, modular design, or packaging extend product lifespan.

FIG. 4: SBD Framework applied to meet Goal 2: "Reducing Energy Consumption": examples of how notifications or changes in the product form can result in lower energy consumption and extended product lifespan.

FIG. 10: SBD Framework applied to meet goal 3 "Minimizing Physical Damage": example of how materials, sensors, or accessories can prevent damage or misplacement and extend product lifespan.

FIG. 11: An easy to grip or slip proof material on the smartphone frame.

FIG. 12: SBD Framework applied to meet Goal 4: "Encouraging Sustainable End of Life Management": identifies potential solutions to educate or inform users about where to recycle or potential reuse options.

DETAILED DESCRIPTION

1. A Sustainable Design Process

Figure 1:
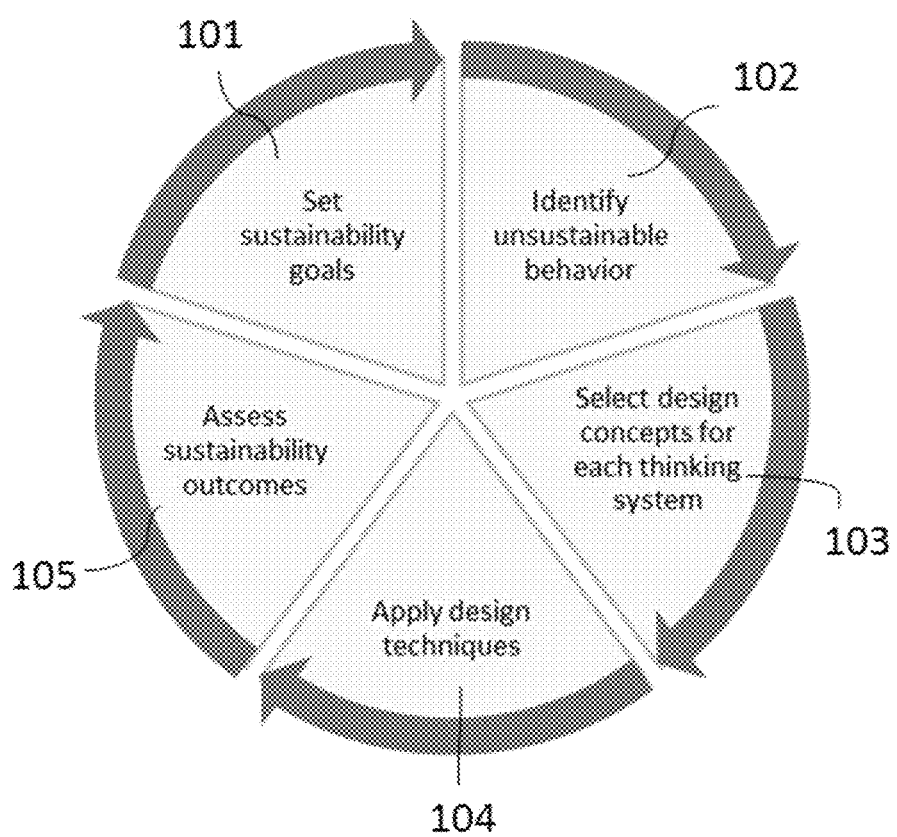
FIG. 1: Iterative process of applying the SBD framework.

To guide the development of sustainable products, a Sustainable Behavior Design (SBD) framework is presented. The springboard for the SBD framework is the 'human thinking system', in other words how people think and behave. Design solutions are linked to the reflective and automatic aspects of the human thinking system. To develop the framework, human behavior theories such as Nudge Theory have been considered to differentiate between conscious and unconscious decisions by people.

The goal of this framework is to develop and apply an integrated suite of eco-design strategies based on the human thinking system to effectively guide the development of sustainable products. This Sustainable Behavior Design (SBD) framework is based on the way the consumer thinks (automatic and reflective thinking) and then builds in design goals 101, human-centered design concepts, and specific techniques to address unsustainable behaviors 102. Because the SBD framework is centered on both aspects of the human thinking system, it provides a holistic and more effective way to influence user behavior and choices during the use phase. The designer select the design concept for each thinking system 103. Then she/he apply design techniques 104. Finally she/he assess sustainability outcomes 105. Ultimately, a designer can use SBD framework presented here to affect and guide how people use a product, thereby, reducing key environmental impacts that are associated with the use phase.

The SBD framework is comprised of several elements: design goals, negative or 'unsustainable' behaviors the goals try to find solutions for or prevent, human thinking system, design concepts, and design techniques. The utility of SBD framework is demonstrated with the case study of smartphones to illustrate how one could successfully integrate the human thinking system into product design. The case study focused on four different challenge areas or goals. For each goal, design solutions is identified to mitigate or stop unsustainable behaviors that would affect both aspects of the human thinking system (reflective and automatic). Some of the solutions are considered primary, i.e., directly influenced by the industrial designer, while others would be thought of as enabling or secondary. Secondary strategies (e.g., apps or software) could also improve the sustainability of device, but would be not directly associated with the designer. Finally, the SBD framework was used to reimagine a smartphone. The environmental performance of the new smartphone design was validated by comparing cumulative energy demand (CED) of a smartphone production and use and its packaging production for the original and new design.

The SBD framework incorporates design concepts and techniques that focus on both aspects of the human thinking system, presenting a holistic and unique opportunity to help consumers select the right products and possibly avert potential unsustainable behaviors when the product is being used. FIG. 1 shows an iterative process of applying the SBD framework. As can be seen, the process of using the SBD framework begins with the designers setting specific goals 101 to prevent or minimize unsustainable behaviors 102. Solutions to these goals are then selected using design concepts associated with subconscious behavior (automatic thinking) and those that intentionally guide behaviors and decisions in a certain direction (reflective thinking) 103. Finally, the concepts are applied with specific techniques to meet the sustainability goals 104. For example, allowing a user to personalize a product or allowing the user to set the orders and layout of the device based on his/her interests and habits may result in the user uses it longer.

Figure 2:
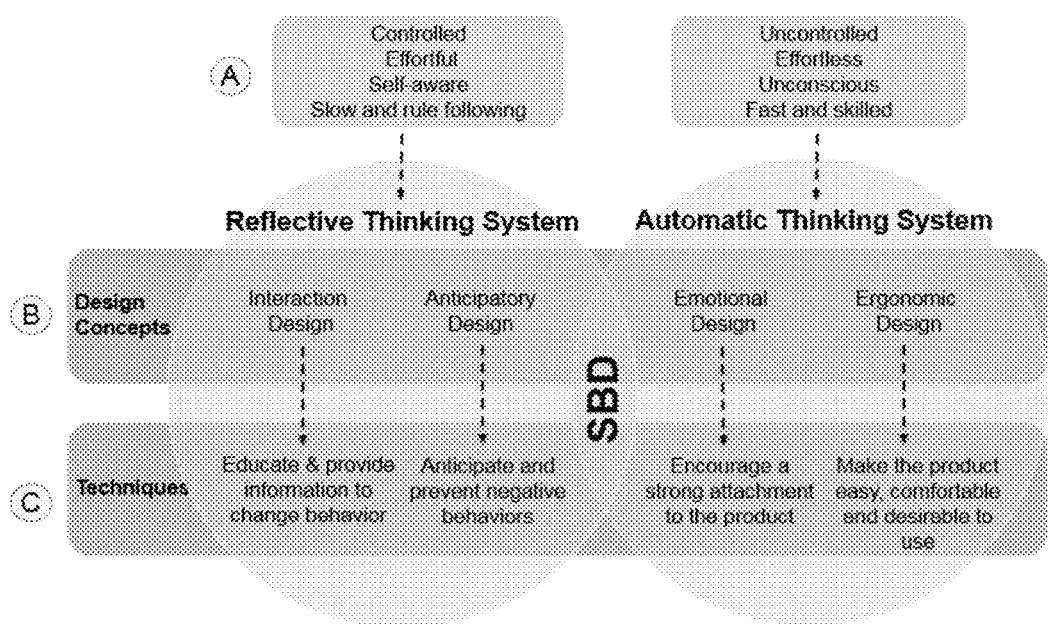
FIG. 2: The SBD framework incorporates (a) traits associated with how people think (reflective and automatic), (b) appropriate design concepts, and (c) product-specific design techniques.

What makes the SBD framework unique is that the final design solution accounts both aspects of the human thinking system. As shown in FIG. 2, the SBD framework incorporates design concepts and techniques that impact the reflective and automatic thinking systems. As can be seen in this figure, the SBD framework incorporates (a) traits associated with how people think (reflective and automatic) (FIG. 2-A), (b) appropriate design concepts (FIG. 2-B), and (c) product-specific design techniques (FIG. 2-C). For example, to influence a behavior reflectively, we use interaction design concepts to communicate or interface with the user to shift the user from one behavior to another. Interaction design mission is to interchange between people, products, services, and our environment. Another way to encourage change based on reflective thinking is to anticipate how a consumer may behave unsustainably and then leverage design features to prevent that outcome. In this model we are referring to this concept as 'anticipatory design.' Both interaction and anticipatory design concepts (and their respective techniques) are under the reflective thinking system because the design makes the user aware of their behavior and then purposefully uses the information to modify his or her actions.

On the other hand, the SBD framework also integrates design concepts associated on automatic thinking, specifically with emotional and ergonomic design. These design concepts encourage a strong attachment and connection between the user and product without the user necessarily recognizing it, but are accomplished in very different ways. For example, emotional design promises to satisfy the user's needs while considering his or her beliefs, thoughts, history, and feelings. On the other hand, ergonomic design considers physical aspects of the human body and how it interacts with the product, to make the product easier, more comfortable to use. Moreover, the attachment between a user and the product may extend the product lifespan and prevent premature obsolescence. Both emotional and ergonomic design are under the automatic thinking system because the user is not aware or does not have control over his or her decisions and actions. While the SBD framework is shown in FIG. 2 with four design concepts (i.e., interaction, anticipatory, emotional, and ergonomic), a designer can incorporate other design concepts and techniques that fit within the SBD framework as needed.

This application introduces a holistic design framework that addresses both aspects of the human thinking system and enables people to think and use consumer electronics in a more environmentally friendly, sustainable manner. The SBD framework will be successfully demonstrated by redesigning a highly demanded and energy intensive consumer electronic, a smartphone, to last longer and have an overall lower energy impact. The SBD framework demonstrates how design plays a critical and direct role in developing products that can be used in a sustainable way. While developed here for consumer electronics, this framework can also be applied to other product systems that have significant use phase impacts such as appliances, personal transportation, and toys.

2. Development of Sustainable Products and Utilities for Consumer Electronics Devices The use of the SBD framework is demonstrated with the redesign of a smartphone. For this purpose, four goals are defined. Each goal relates to both aspects of the human thinking system (automatic and reflective), ultimately influencing the sustainable use of the smartphone. The four goals include reducing the frequency of purchase and energy consumption, minimizing physical damage, and encouraging sustainable end of life (EOL) management. The SBD framework provides an array of primary and secondary design pathways to solve the unsustainable behaviors. The primary strategies are accomplished directly by the industrial designers during the design phase. Secondary or enabling solutions such as an accessory, app, or software can also be an effective way to change user behavior, but are not directly created by or under the control of the industrial designer. For each goal, a number of new implementations or utilities will be introduced to fulfill that goal.

As noted earlier in FIG. 1, application of the SBD framework is meant to be iterative, like other types of human-centered design. The addition of a prototyping and testing phase to the SBD framework will improve the overall design of the product. Below, each goal is defined and described in the context of a range of solutions that impact both aspects of the human thinking.

2.1 Goal 1: Reducing Purchase Frequency

In this sub-section, we introduce apparatus and methods to fulfill this design goal. Smartphones are often replaced prior to reaching true obsolescence for various reasons. The first goal, reducing the frequency of purchase, seeks to diminish the unsustainable behaviors of desiring "the next best thing" or purchasing a new smartphone instead of repairing an existing one. Wireless carriers also indirectly influence this behavior with contract upgrades and service agreements. New service agreements (e.g., AT&T Next$^{sm}$) allow people to upgrade to a new device at any point. As a result of these behaviors, the lifespan of a smartphone is only about 2.5 years on average, but often much lower. FIG. 1 shows the SBD framework applied to meet Goal 1 "Reducing Purchase Frequency". As shown in this figure, a range of potential design concepts and techniques can be applied to achieve this goal by integrating both aspects of the human thinking system. For example, a designer could influence the user subconsciously with an emotional design by allowing the user to add his or her memories, symbols, or images to the frame itself. Therefore, the user would be less likely to give up their phone since it is a reminder about something special that happened in his or her life. In addition, modular design, or packaging can be employed to extend product lifespan.

2.2 Goal 2: Reducing Energy Consumption

In this sub-section, we introduce apparatus and methods to reduce energy consumption in smartphones. As shown in FIG. 4, Goal 2 recognizes three types of unsustainable behaviors that center on the battery. For example, overcharging and undercharging a battery can reduce its life and may result in unnecessary energy consumption. A battery charged only 40%, but running at 104 degrees Fahrenheit will result in a 15 percent decrease in battery life capacity over one year. If left fully charged but plugged in all day, the battery lifespan decreases by 35% over the year.

2.2.1 A New Implementation for Charger Mechanism

Figure 5:
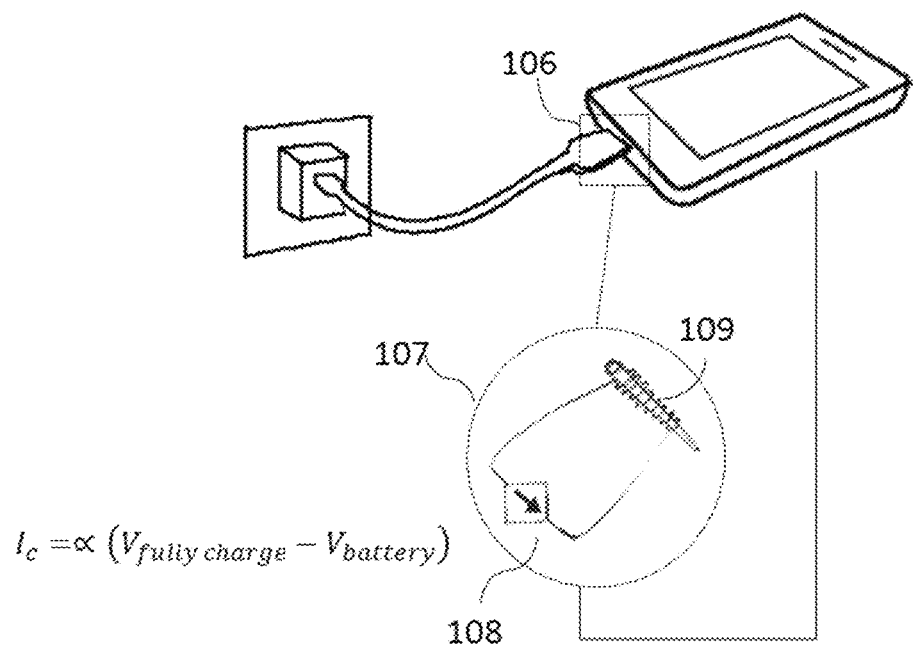
FIG. 5: A new design for charger plug in, that its attachment mechanism is controlled by an electro-magnetic field. The field weakens as the battery is charged.

To address this concern, a plug is designed which is slightly difficult to detach from the product while the battery is undercharged, but can be easily removed when the battery is fully charged. FIG. 5 shows a new design for charger plug in, where its attachment mechanism is controlled by an electro-magnetic field. The electromagnetic field weakens as the battery is charged. A slightly different design automatically disconnects the charging cable from the smartphone power port by making the connection loose when the battery is fully charged.

In one embodiment, the attachment mechanism 106 is implemented through an electromagnet system where the current 108 (drifted from the power source and) generating the magnetic field is controlled through a feedback mechanism affected by the charged level of the battery. For example, the intensity of the magnetic field of the attachment 109 can be made proportional to the difference of the battery voltage from the full battery charge level. Alternatively, the average current controlling the electromagnetic field of the plug, might be inversely proportional to the battery voltage level such that as the battery is charged more, the connection becomes looser.

In another embodiment, the intensity of the magnetic field will be determined through changing pulse width modulation (PWM) or pulse duration modulation (PDM) of the input current based on the charged level feedback. Any or all of the following techniques including, delta modulation, delta sigma modulation, space vector modulation, direct torque control (DTC), time proportioning, or other modulation techniques may be applied for the implementation. Therefore, the design gives information to the user and guides them towards making an environmentally sound decision.

Figure 6:
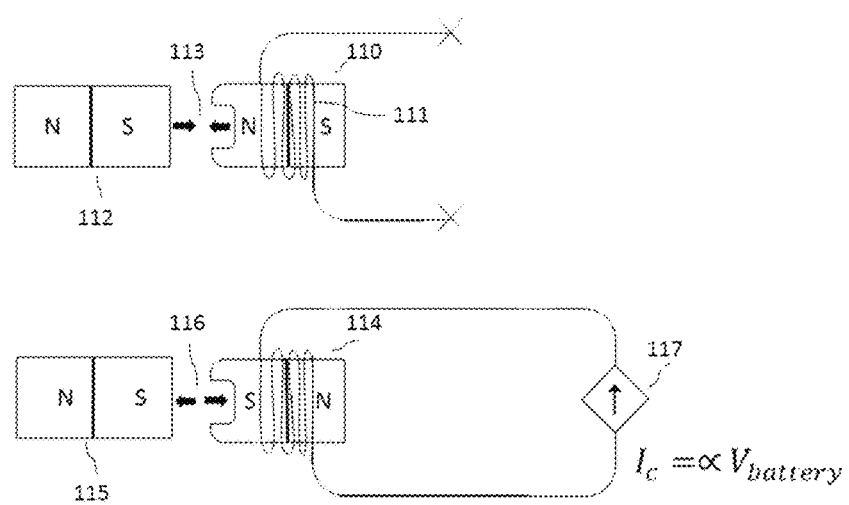
FIG. 6: A new design for charger plug in, wherein the magnetic poles reverted because of the intensity of an electromagnetic field controlled by the battery voltage.

Another implementation for charger plug in is shown in FIG. 6. In this implementation, the magnetic poles of the connectors 110, 112 initially set to attract each other 113 when the current drifted from the battery is zero 111. Then, as the battery charges, the magnetic poles of one connector reverted 110, 114 because of the intensity of an electromagnetic field controlled by the battery voltage. This could happen for example when the electromagnetic field induced by a voltage controlled current source 117 counteracts the effect of the permeant magnetic field in such a way that overall magnetic pole direction reversed 114 (South and North poles reversed in one connector). Therefore, the connectors 114, 115 repel each other 116.

One skillful in the art knows that similar techniques may be used to make the design of chargers more sustainable for other electronic consumer products such as laptops, pocket PCs, tablets, PDAs, e-readers, wearable devices, shavers, razors and etc.

2.2.2 A New Implementation that Allows Air Circulation to the Case

Figure 7:
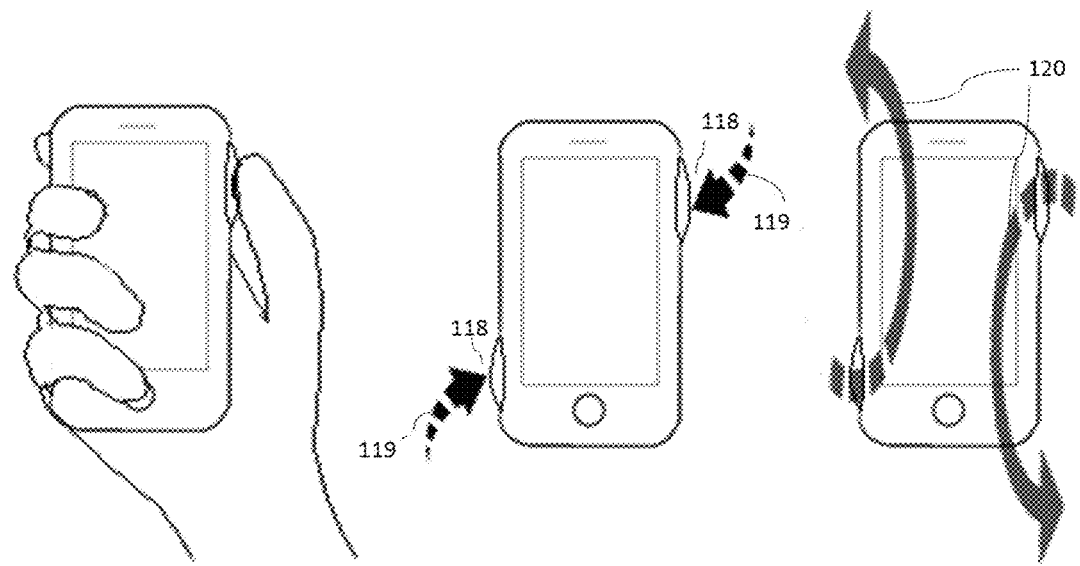
FIG. 7: A squeezable mobile frame that allow air circulation in the mobile case.

In one embodiment, as demonstrated in FIG. 7, a squeezable mobile frame 118 is presented that circulates air 119, 120 into the mobile case and cools down the battery.

2.2.3 A Ventilation System

Figure 8:
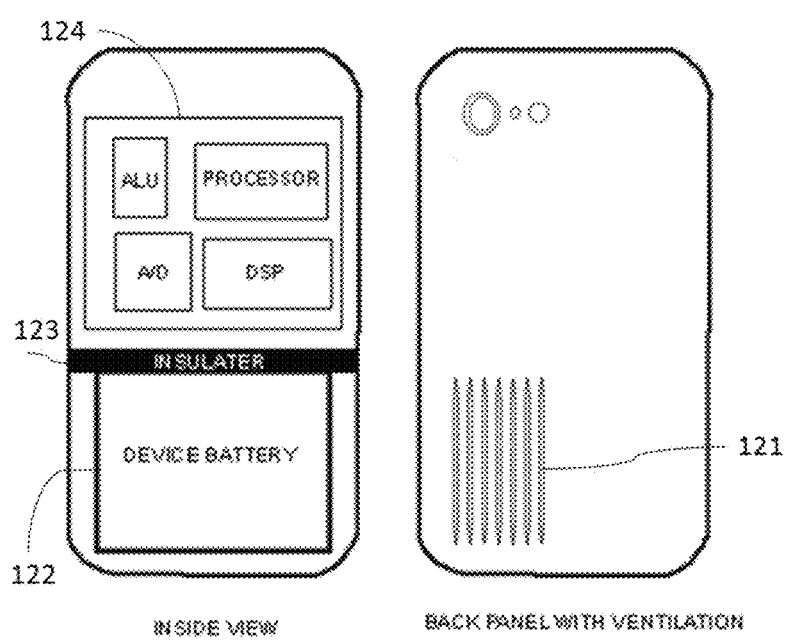
FIG. 8: A ventilation system for the smartphone.

In another embodiment as demonstrated in FIG. 8, a ventilation system is designed that isolate the battery from the electronic board and use a combination of grooved heat sinks. In another design, the body of the smartphone has a perforated surface 121 which allows air to ventilate and cool the battery. A thermal insulator 123 may also be employed to isolate the battery 122 from the electronic processors 124 to prevent heat from passing between them.

One skillful in the art knows that similar apparatus and techniques may be used to improve ventilation inside other electronic devices such as tablets, laptops, pocket PCs, PDAs, e-readers, wearable devices, shavers, razors, and etc.

2.2.4 An Alerting System to Encourage Sustainable Behavior by the User

Figure 9:
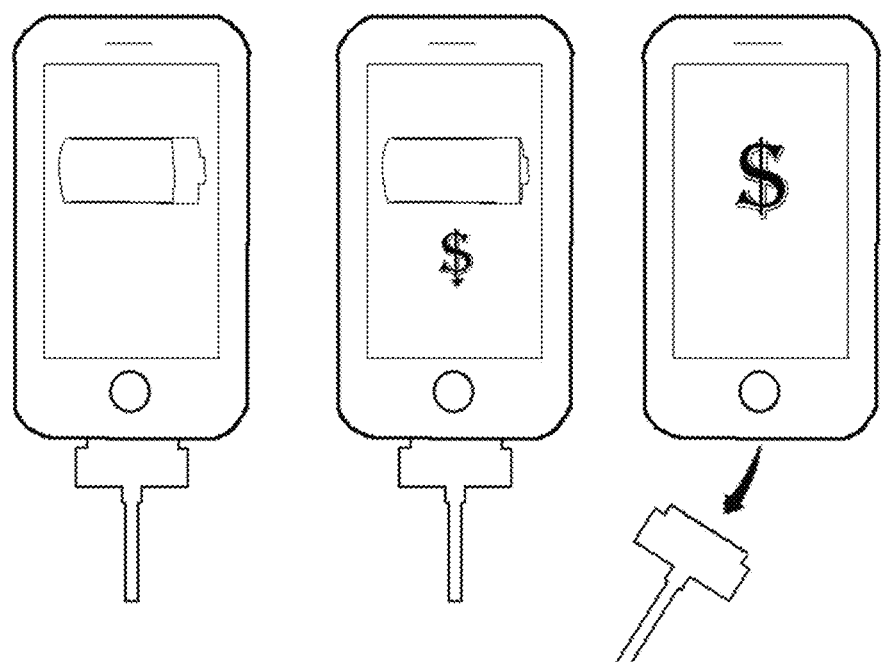
FIG. 9: An alerting system to encourage sustainable behavior by the user.

In addition, some apps and software gadgets may be used in conjunction with temperature sensor(s) located inside or on the surface of the smartphone to alert the user to stop using the device when it gets extremely hot inside (definable through setting a threshold level for the temperature). This system can also be useful for safety purposes to prevent smartphone explosion. Alternatively, an alert system may be employed to encourage sustainable behavior by the user. For example, the system can show a notification that explains the monetary cost of energy being used as shown in FIG. 9.

Moreover, some apps and software gadgets may be used to alert the user to stop charging the device when the battery is over charged.

One skillful in the art knows that similar apparatus and techniques may be used to improve sustainable behavior among the users of other electronic devices such as tablets, laptops, pocket PCs, PDAs, e-readers, personal digital assistants, wearable devices, shavers, razors and etc.

2.3 Goal 3: Minimizing Physical Damage

In this sub-section, we introduce apparatus and methods to minimize physical damage. As shown in FIG. 10, Goal 3 seeks to reduce behaviors that result in physically damaging the phone, and therefore shortening its lifespan. One example of this behavior that the framework seeks to address is dropping or losing the device or accidentally exposing it to water or extreme temperatures. FIG. 10, shows how specific selection of materials, sensors, or accessories can prevent damage or misplacement and extend product lifespan.

As shown in FIG. 11, using an easy to grip 125 or slip proof material 126 on the smartphone frame will enable the user to hold onto the device and be less likely to drop and cause damage. Also, incorporating durable and shatterproof materials in the frame will prevent damage by protecting the phone even if it is dropped. In both these examples, changing the external form of the product prevents or minimizes damage without the user's awareness.

2.4 Goal 4: Encouraging Sustainable End of Life Management

In this sub-section, we propose apparatus and methods to encourage sustainable end of life management in smartphones. As shown in FIG. 12, Goal 4 "Encouraging Sustainable End of Life Management" seeks to prevent the user from either disposing the product in improper waste channels or from keeping it in storage too long. This figure identifies potential solutions to educate or inform users about where to recycle or potential reuse options. In 2007, only 10% of mobile phones were recycled in the U.S., and in 2010, 11% of all mobile devices (including smartphones, pagers, personal digital assistants, and basic mobile phones) were recycled. Huang and Truong found that people would prefer to store rather than donate or recycle their obsolete phones because they do not know where to recycle the product or they consider the process of finding a recycling facility to be inconvenient. In addition, although the packaging of mobile devices is a delicate issue, people usually lose the retailer box and cannot use it again to return it to manufacturer for repair.

2.4.1 A Dual Purpose Packaging Scheme

Figure 13:
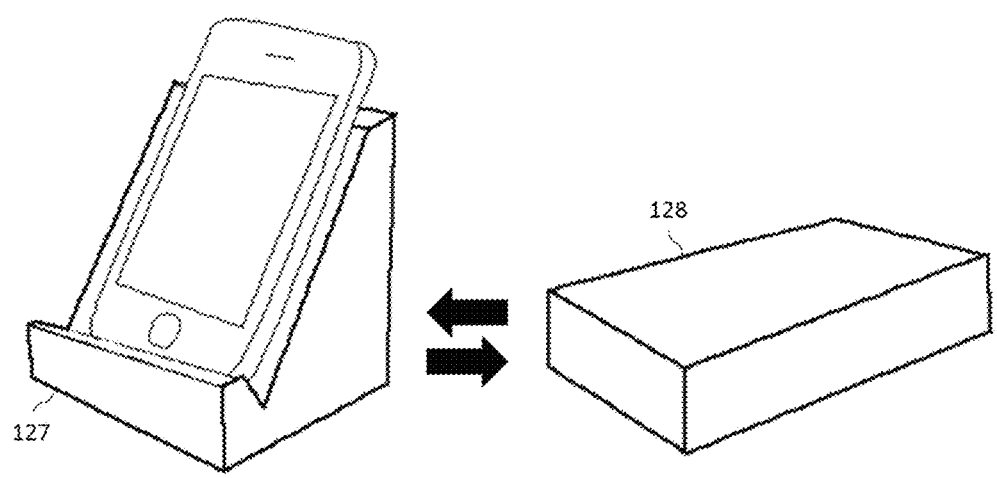
FIG. 13: A dual purpose packaging scheme.

In one embodiment, shown in FIG. 13, a dual purpose packaging scheme is disclosed. In this scheme, the original packaging can be designed such that it becomes a stand 127 for the device while the product is being used. Then the stand can be converted back into a mailing package or box 128 so the user can easily and conveniently send back to the product to the manufacturer for proper recycling. Needless to say, the original packaging may contain labels which identify the product uniquely (such as S/N) and hence make the recycling much easier. This encourages people to manage their smartphones in a sustainable manner (recycling or reuse). In this design, the package will be folded over to become a stand for the product when it is not in use.

In another embodiment, the original packaging can be designed to be transformable to a passive speaker bass for the phone. In this way, it could be placed on top of the smartphone speaker to make a passive bass. For example, the box can be designed in the right dimension and folded to make a Helmholtz resonator (or universal resonator) which take advantage of air resonant in a cavity to amplify certain frequencies in the sound. In this way, the packaging can be reused to make discrete acoustic filters.

One skillful in the art knows that similar package design could be used to allow dual usage of packaging for other electronic devices such as such as tablets, laptops, pocket PCs, PDAs, e-readers, wearable devices, shavers, razors and etc.

2.4.2 A Loss and Anti-Theft Prevention System Using Radio Frequency Beacons (or Tags)

Figure 14:
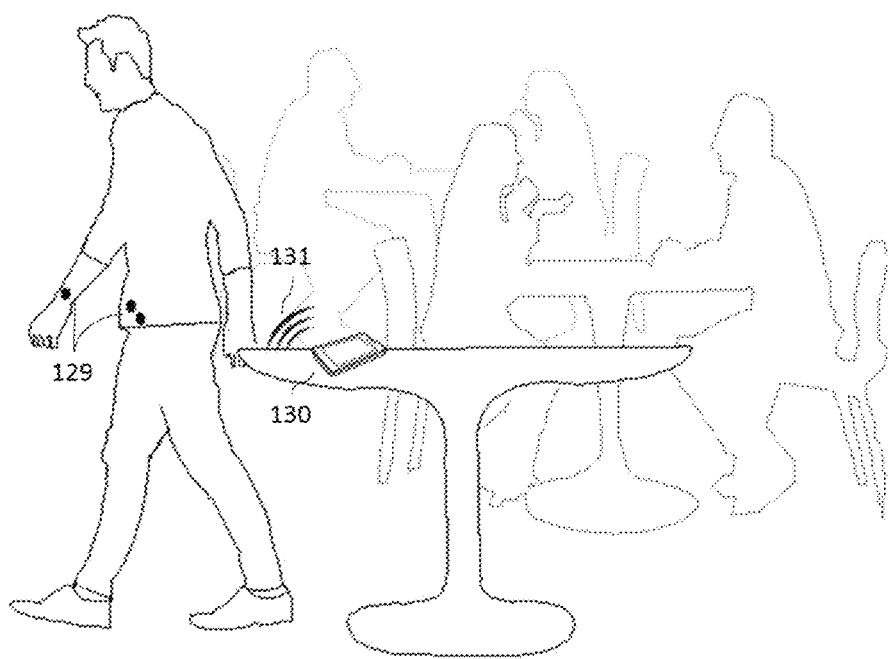
FIG. 14: A loss and anti-theft prevention system for smartphones using radio frequency beacons

In another application, shown in FIG. 14, a loss or anti-theft prevention system using radio frequency beacons is disclosed. The system can alert the smartphone users if they leave their phone or other belongings behind for example in a social gathering or restaurant.

In one embodiment, a system introduced which comprises radio frequency tags, tag reader devices, processor unit, single or multiple transmitter antennas, single or multiple receiver antennas. The radio frequency tags could be active or passive RFiD tags, Bluetooth tags, Bluetooth LE tags, Bluetooth beacons or any other radio transmitter whose signal can be read by tag reader.

The tag reader, processor unit and the receiver antenna(s) may be collocated in a smartphone 130. The processor unit may be capable of doing both signal processing and general processing. The tags may optionally be equipped with speaker or microphones.

Alternatively, the system may employ radio frequency beacons and RF receivers instead of radio frequency tags and tag reader device. Each beacon is capable of transmitting a radio frequency. In addition, it might optionally be capable of broadcasting their transmitted power levels or their identity. The receiver might be capable of scanning the radio frequency spectrum to find out the nearby beacons and measure the received signal. The system may also employ single or multiple antennas for the beacons and single or multiple antennas for the receivers.

In addition, if active tags selected for implementation, they may optionally use energy harvesting techniques (for example from a solar or motion energy source), to lengthen the battery life.

One or multiple beacons (or tags) 129 are carried by the user and other beacons (or tags) will be attached to their belongings 138, 139 such as bags, purses, handbags, keys and so on.

The signal from one beacon (or one tag) or group of beacon (or group of tags) worn by the person will be used by RF receiver (or tag reader) and the processor unit (or the smartphone) to estimate the distance of the user from smartphone by analyzing characteristic of the signal received from this beacon or group of beacons (or this tag or group of tags). The beacons (or tags) on the other belongings provide an approximate of how close they are to RF receiver (or the tag reader) and the processor unit. In case the smartphone act as the RF receiver and processor unit (or tag reader and processor unit), the distance will be estimated relative to the smartphone.

A mapping database may be used to extract the distance estimate based on received signal strength indicator (RSSI) from the beacons (or tags) considering the transmit power. That mapping database may be built based on propagation model or empirical experiment.

Alternatively, the distance may be estimated by measuring received signal strength indicator (RSSI) from the RF beacon in the smartphone (or multiple smartphones), normalizing the values with the transmit power of the beacon, querying an RSSI-distance mapping database to estimate the distance of the user from each smartphone (or multiple smartphones).

In an alternative implementation, to reduce the effect of noise and fading a time average of RSSI values would be used to calculate RSSI reference values used to query the distance mapping database. This scheme may be useful to improve the accuracy of the distance estimation.

$$RSSI_{ref} = \text{AVERAGE}_t (RSSI_t)$$

Figure 15:
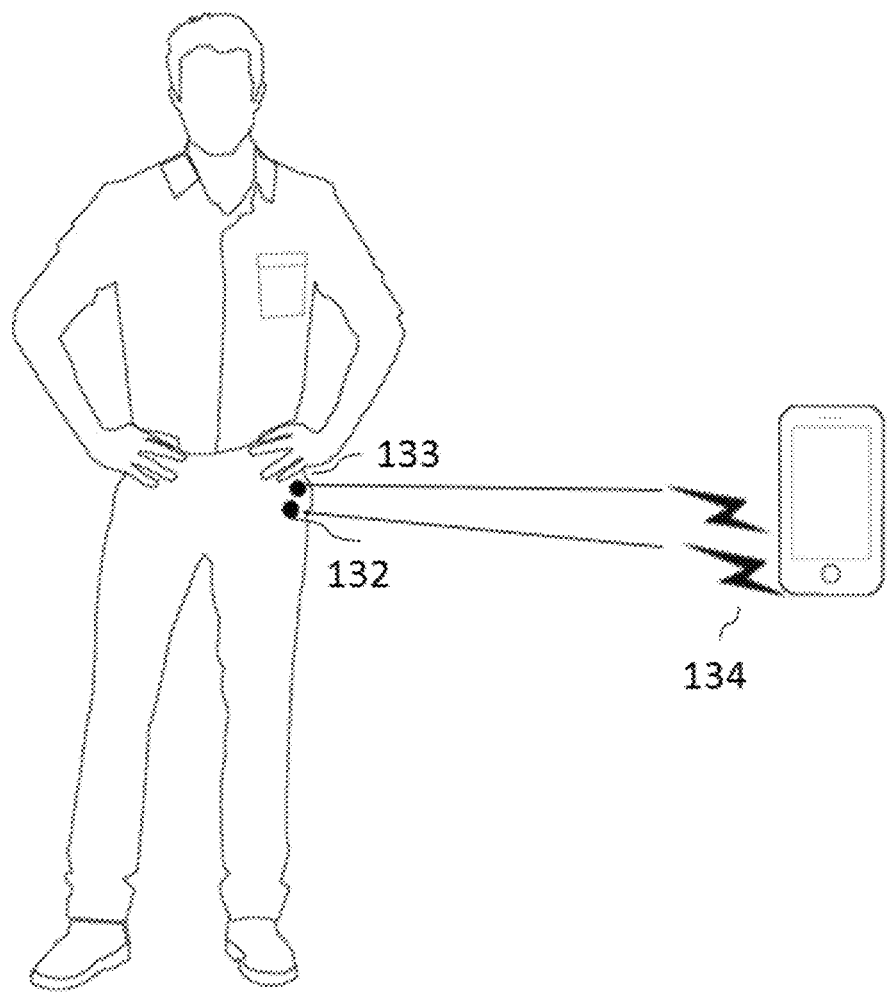
FIG. 15: A distance measurement system employing two co-located beacons.
Figure 16:
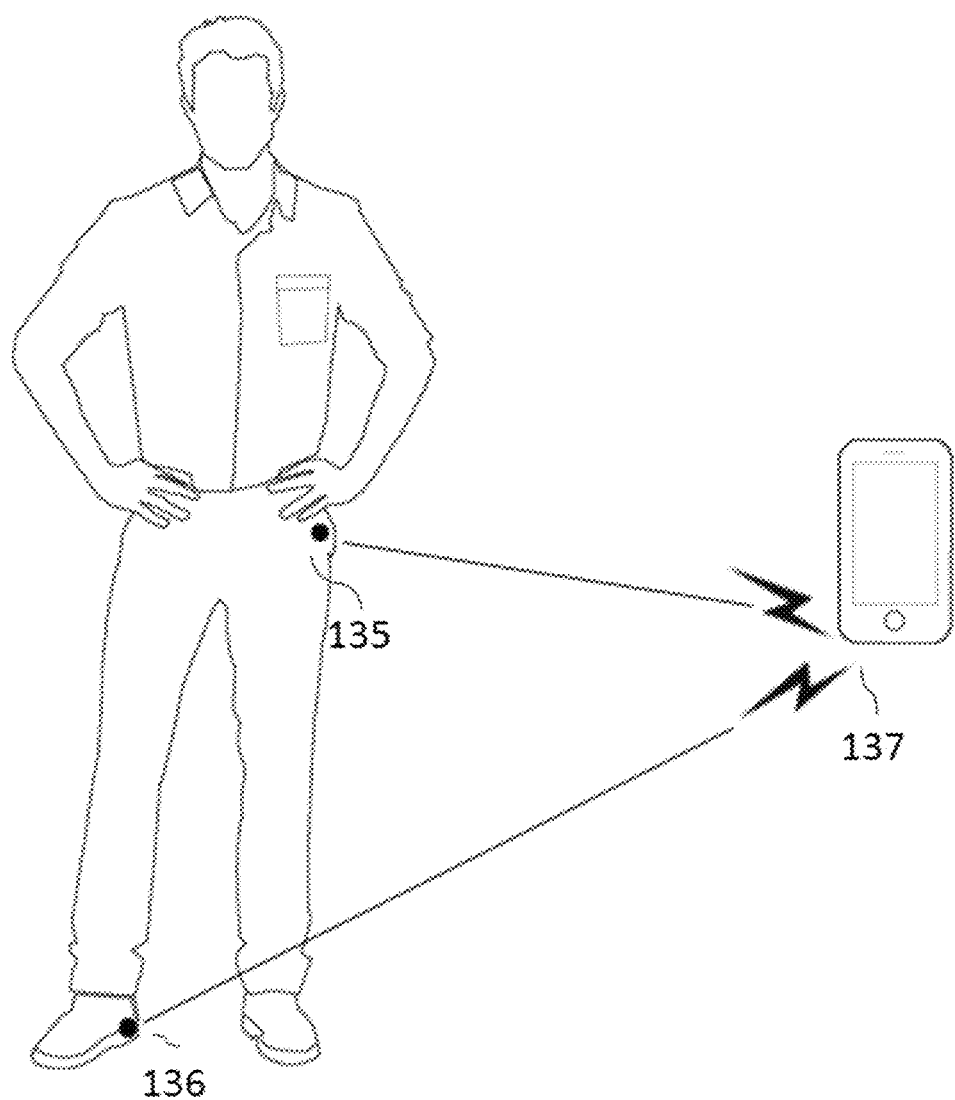
FIG. 16: A distance measurement employing two beacons worn by the user.

In an alternative implementation, two or more beacons (or tags) are worn by the user in different part of the body as illustrated in FIGS. 15-16 and a reference RSSI would be calculated from a combination of RSSI values from these beacons (or tags) before querying the RSSI-distance mapping database.

In one embodiment, two co-located beacons are employed for distance estimation between the person and the object. For example, two beacons (or tags) are worn by the user and they are attached back-to-back 132, 133 (or back-to-front) as illustrated in the FIG. 15. Then, their RSSI values at the smartphone 134 will be used in combination with each other to help reduce the effect of fading and other uncertainties in RSSI for distance estimation. For example, the larger RSSI value from these two could be selected as the reference RSSI to query the mapping database to find corresponding distance.

$$RSSI_{ref} = \max(RSSI_1, RSSI_2)$$

Alternatively, two or multiple beacons 135, 136 (or tags) are worn by the user in different part of the body as illustrated in FIG. 16. For example, one can be worn on the users' shoe 136 (either built into the shoe, built into the insole, or attached to the exterior of the shoe) and the other one will be worn as a wrist band or even clipped 135 to the clothes. The more distance between the beacons, the more reliable would be the RSSI reference.

Another formula that can be used to evaluate the reference RSSI from combination of RSSI values (three or more) would be as follows:

$$RSSI_{ref} = \max_i RSSI_i$$

Alternatively, following formula may be employed to derive the reference $$RSSI_{ref} = \frac{1}{2} * (RSSI_{(n)} + RSSI_{(n-1)})$$

where $RSSI_{(n)}$ and $RSSI_{(n-1)}$ stands for the two largest values among $RSSI_i$ and n is the number of tags. Each of these formulas mitigates the effect of deep fade to some extent. A time average of these reference signals over a specific time period may be used to mitigate the effect of noise and fading even more. For example $$\text{Average\_RSSI}_{ref} = \sum_{k=1}^{n} RSSI_{ref,k}$$

where $RSSI_{ref,k}$ denote the $RSSI_{ref}$ at time $t=t_k$. In this case, Average_$RSSI_{ref}$ would be used for RSSI-distance mapping.

In another embodiment, the smartphone does not count on the RSSI/distance mapping to evaluate the distance of the objects and the user from the mobile-phone but instead ask the user to indicate the threshold RSSI values to distinguish close, mid-range and far distance. This can be done through a set of experiment where user put a tag connected object in a preferred distance which she/he would consider as maximum distance for a closed object and then press a button or select from a drop-down menu to let the smartphone record the RSSI received from the object as the threshold for close distance. She/he may repeat the experiment to let the smartphone decide suitable RSSI threshold levels corresponding to mid-range or far distance. Needless to say that as few as one or as many as needed thresholds may be defined and used depending on the application.

The beacons (or tags) worn by the user will be defined as primary beacons (or primary tags). The software will be programmed such that if the distance of the smartphone and primary beacons (or tags) becomes more than a preset value (or alternatively if the beacons/tags go beyond the close or mid-range distance) both devices start beeping which is an indication that the smartphone is getting far from the user. This mechanism helps to remind the user if they left the smartphone behind. The beeping mechanism may be programmed such that the sound gets softer as the primary beacons (or primary tags) and the smartphone get closer to each other. This helps the user to move in the area and find the location of the smartphone if it is located somewhere out of sight.

In another embodiment, an easy mechanism is used to temporarily disable the beeping feature between the primary beacons (or primary tags) and smartphone for a predefined period of time (that can be selected, for example, from a drop-down menu containing 5, 15, or 30 minutes). That is useful, for example, when the user goes to the bathroom while he/she leaves his/her smartphone and other belongings on the table or with a friend. The system not only provides a mechanism to link the smartphone and the user but also is useful to link secondary beacons (or secondary tags) too. That's because a similar threshold setting mechanism can be used to control the distance of the secondary beacons (or secondary tags) from the smartphone while the primary beacons (or primary tag) is in the vicinity of the smartphone. If the distance of the secondary beacons (or secondary tags) from the phone gets farther from the preset radius, while the smartphone and the primary tags are located close to each other, the smartphone and secondary/primary beacons (or secondary/primary tags) may start beeping again. The beeping mechanism may be programmed such that the sound gets softer as the secondary beacons (or secondary tags) and the smartphone get closer to each other to help finding the secondary tags. In addition, a separate beeping sound may be allocated to each beacon (or tag) in order to differentiate which beacon (or tag) is out of the close ring.

The smartphone acts as a base station for this design where all the signals from each beacon (or tag) can be received and analyzed. If the purpose of loss prevention is not the smartphone itself, then any other smart device, for example smart-watch, tablets, pocket PCs or wearable smart-DSP chips, can be used to receive and analyze (and potentially control) the signals from each beacon (or tag).

Figure 17:
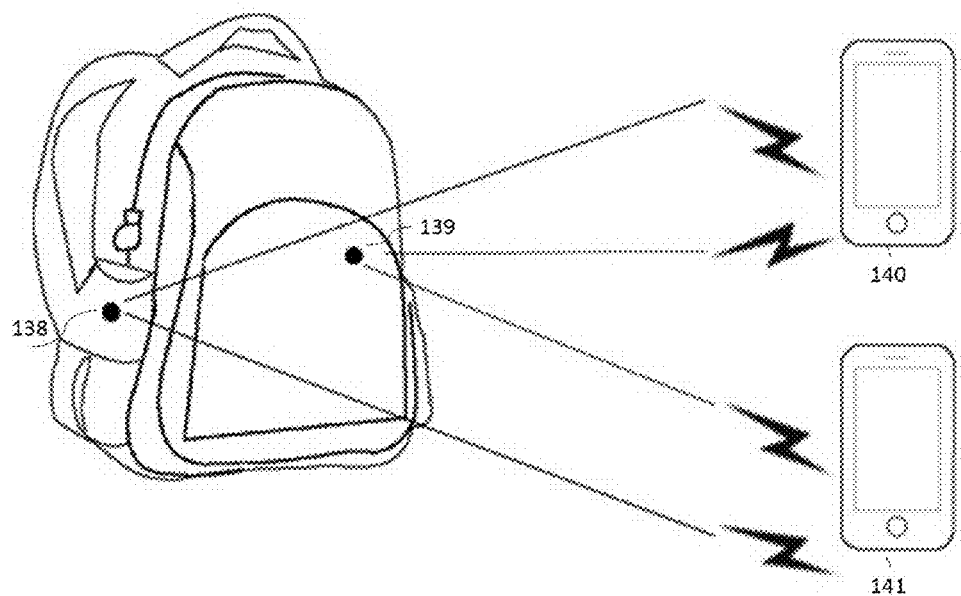
FIG. 17: An object localizer system employing two closely attached beacons and two base-stations (smartphones). The base-stations share data with each other to improve accuracy of location estimation.

In another embodiment, an object localizer system employing two attached beacons and two base-stations (smartphones) are disclosed as illustrated in FIG. 17. In this scheme, if two or more smartphones 140, 141 are available in the same area, they can share their relative locations and the RSSI values from the objects to provide a more reliable estimate of the location of the surrounding beacons 138, 139 (or RF tags) as shown in FIG. 17. This could be done through an approximate trilateration (or multilateration) technique or HD-GNSS techniques, which are well-known in GNSS application. In addition, the data may be used to filter unreliable RSSI values. Alternatively, the two smartphones may employ the shared data to find out the orientation of the object toward, or just a better estimate of the distance from, each of them.

It is also possible to design a graphical user interface to illustrate the relative distance of all beacons (or RF tags) from the phone. The GUI may also provide a user-friendly mechanism to define the beacons (or tags) allocated to each object. In case more than two mobile devices are used as a base station and share the data, it is possible to show in what direction the object is from the mobile phone. The software application may use smartphone gyroscope data to update this direction as the user turns the phone.

Figure 18:
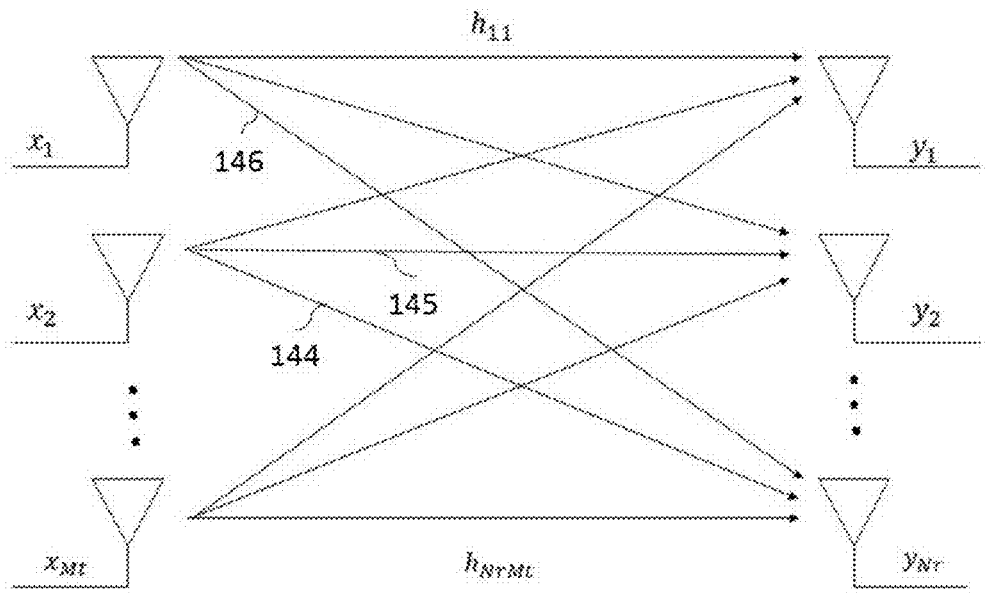
FIG. 18: RSSI matrix calculated for multiple transmitter and receiver antennas.

In another embodiment, the relative distance and location of the tags would be evaluated based on signals transmitted from plurality of transmitter antennas 142 on the RF beacon (or RF tag) to plurality of receiver antennas on the smartphone 143 (or tag reader). For example, the RSSI matrix calculated from each signal traveling between each transmitter and each receiver signal may be used to estimate the distance from the center of transmitter antennas to the center of receiver antennas (FIG. 18). This scheme may be useful on mitigating the effect of fading, noise and other uncertainties on RF signals.

Figure 19:
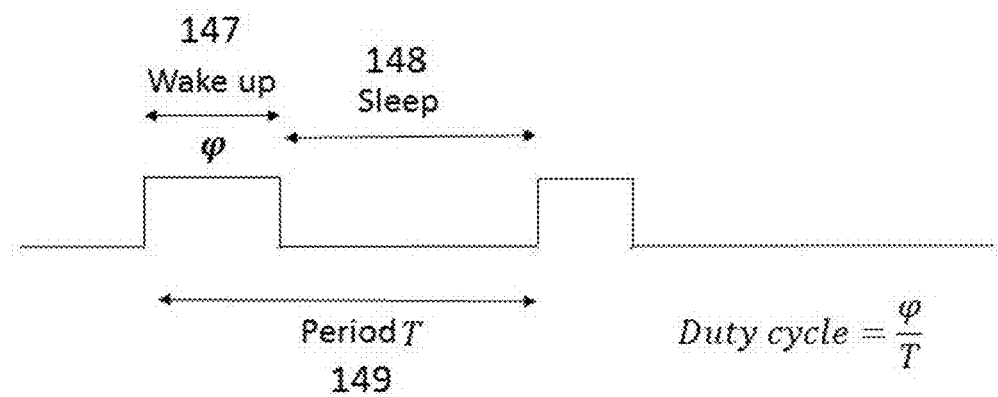
FIG. 19: Wakeup-sleep cycles and relevant parameters.

In one embodiment, the above-mentioned transmitters may become enabled based on an adjustable duty cycle on a periodic basis 149. This helps the smartphone or potential active tags (or beacons), save energy on the sleep cycle 148 as demonstrated in FIG. 19. The duty cycle and period of wakeup-sleep 147, 148 may be adjusted for different type of tags and different energy saving goals. In addition, these parameters may adaptively be controlled through a feedback from the device battery. This may help the battery require less frequent charging.

In another embodiment, the system may employ two different types of tags (or beacons) simultaneously to increase the accuracy of distance measurement.

Moreover, one skillful in the arts knows that similar methods and apparatus can be used to monitor kids' activity in a public environment. In this application, relative location and distance of kids from their parents may be identified using signals transmitted or received from single or plurality of smartphone devices to single or plurality of RF beacons (or RF tags) worn by kids through the above-mentioned techniques.

One skillful in the art knows that the above-mentioned techniques may also be employed using any wearable device capable of transmitting an RF signal or reading an RF beacon (or RF tag) instead of an smartphone. These wearable devices include but not limited to smart watches, wearable DSP processors and so on. In addition, the same techniques may be applied on tablets, PDAs, e-readers, wearable devices, or pocket PCs to prevent leaving them behind or to localize objects around them.

One skillful in the arts knows that the above-mentioned methods and apparatus may be used for any indoor or dense urban localization and tracking where signal from satellite is either not available or does not provide any accurate estimate. The localization may be done through for example measuring received signal strength indicator (RSSI) of the RF beacon in multiple fixed base stations installed around the facility (or multiple smartphones), normalizing the values with the transmit power of the beacon, querying an RSSI-distance mapping database to estimate the distance of the user from each fixed base station (or multiple smartphones), and using a trilateration/multilateration techniques. In addition, in the case that smartphones or base-station take benefit from multiple antennas, the direction of arrivals techniques may be employed to find out the location of the objects attached to beacons (or RF tags). Therefore, the application is included but not limited to theft prevention systems in retail stores, lost object tracking, children safety watching, staff tracking and so on.

One skillful in the arts knows that before-mentioned techniques for distance measurements and localization through measuring RF signals traveling between smartphone and RF devices attached to the target object, can be implemented similarly if smartphone transmits the RF signals and the signal is measured at RF receivers attached to the object. In addition, the accuracy of distance mapping can be increased if combination of RSSIs from multiple antennas on the receiver side (or equally a combination of RSSIs from multiple antennas in the transmitter or multiple antennas in both sides) is employed.

Figure 20:
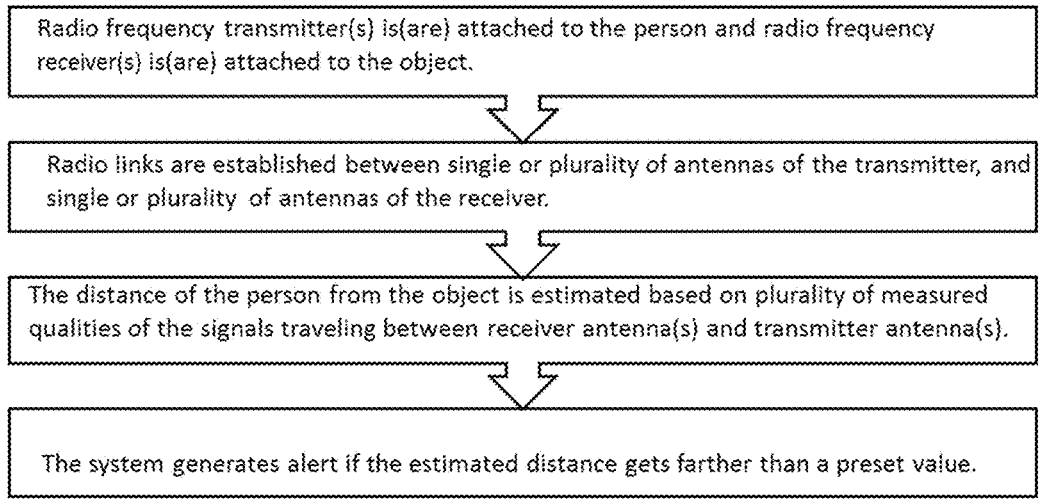
FIG. 20: Mechanism 1 of alerting the loss of an object.
Figure 22:
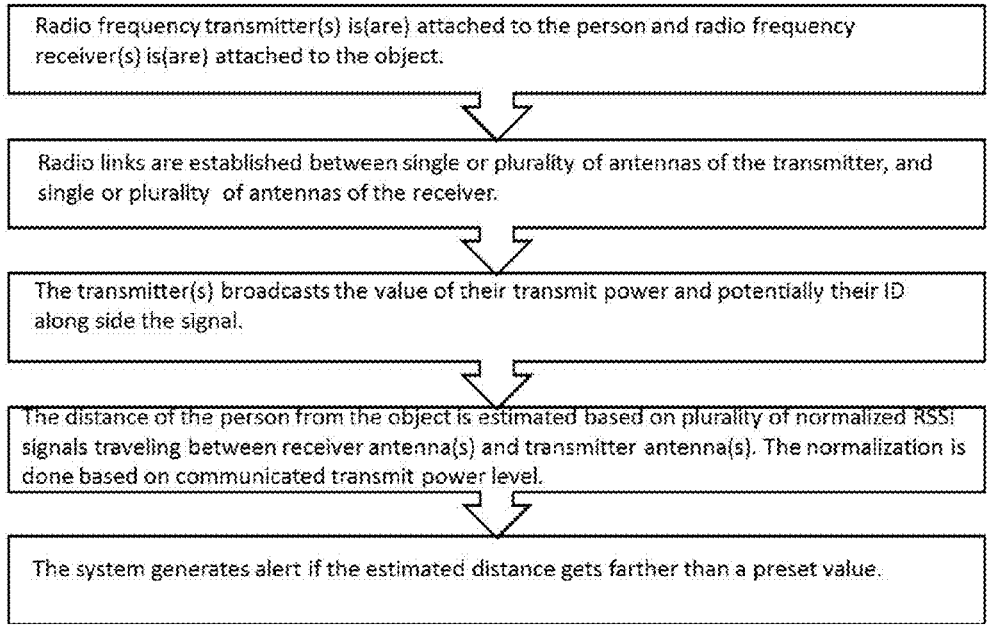
FIG. 22: Mechanism 3 of alerting the loss of an object using normalized RSSI as signal quality.

FIGS. 20 and 22 encapsulates two mechanisms of implementing the overall anti-loss alerting system when RF transmitters are attached to the person. In mechanism described in FIG. 22, a normalized RSSI is used to evaluate the quality of the received signal.

Figure 21:
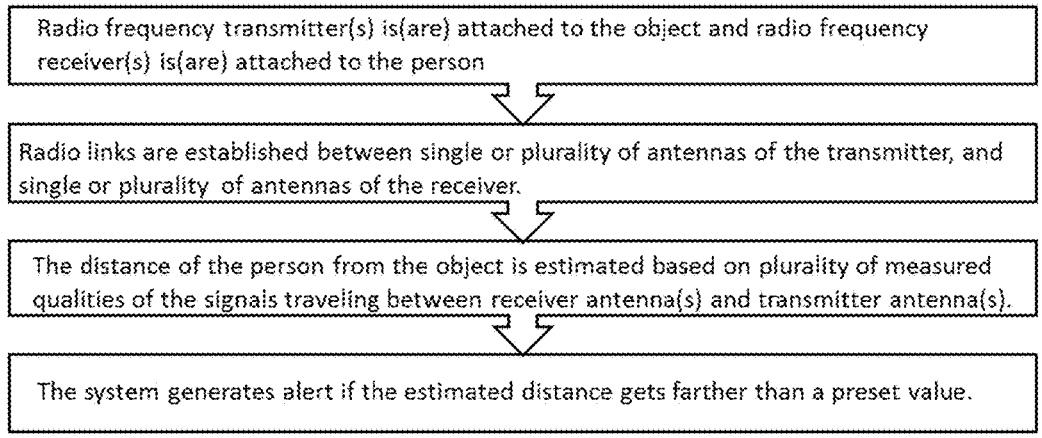
FIG. 21: Mechanism 2 of alerting the loss of an object.
Figure 23:
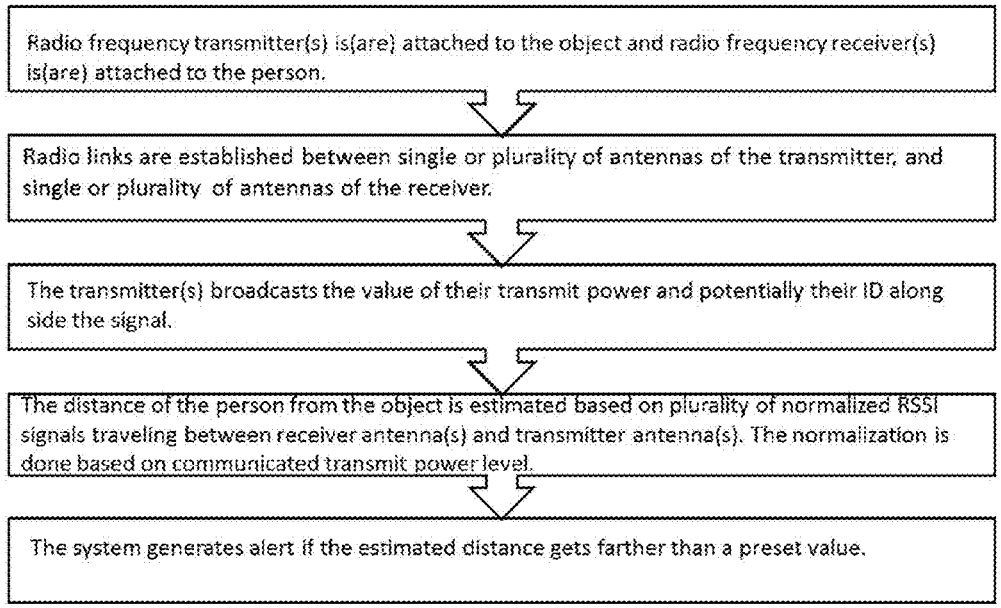
FIG. 23: Mechanism 4 of alerting the loss of an object using normalized RSSI as signal quality.

FIGS. 21 and 23 encapsulates two mechanisms of implementing the overall anti-loss alerting system when RF transmitters are attached to the object or when the smartphone transmit the RF signal. In mechanism described in FIG. 23, a normalized RSSI is used to evaluate the quality of the received signal.

One skillful in the arts knows that the same techniques and methods may be employed using acoustic or sonar transmitters and receivers instead of radio frequency beacons and receivers for loss and theft prevention.

3. Smartphone Reimagined with the SBD Framework

Thus far, FIGS. 3-23 have demonstrated a wide array of individual design techniques inspired by the SBD Framework concepts. However, this framework is optimized by integrating design strategies that span both aspects of the human thinking systems and incorporate multiple design techniques for a more holistic outcome. In an industrial product realization process, not all techniques will be feasible, due to competing cost, performance, or brand requirements. However, the framework provides sufficient flexibility to choose among the recommended design techniques. This integration is demonstrated here by reimagining design of a smartphone that meets all four goals and accounts for both aspects of the human thinking system.

Four elements of the design solution incorporate reflective thinking and meet all four goals. Goal 1 is achieved with a modular design to allow users to upgrade or change a specific part and extend the product lifespan. For example, a user can upgrade the phone's camera or replace part of a broken frame by changing one part of the phone rather than the whole frame. Goal 2 educates and makes the user aware of how their current behavior impacts energy consumption by texting or sending an image notification. Goal 3 uses sensors within the product to detect distance from the user and send signals that prevent someone from losing their phone. Goal 4 focuses on packaging design wherein the user is able to transform the original packaging into a stand to hold and charge the phone and to then be used to mail the product back to the manufacturer for recycling at end of life. The solutions for Goals 1 and 4 are considered primary because they are directly influenced by the designer, while the solutions for Goals 2 and 3 are enabling, which means that other specialists (software and app designers) contribute.

For automatic thinking, the SBD framework successfully meets three of the four goals. The first goal is achieved by providing the capability to add memorable or nostalgic pictures to the frame to remind users of experiences they had while using the phone. This concept is intended to create attachment between product and the user, and encourages the user to keep the product for longer period of time. Designing a modular form as explained earlier helps the designer to apply this concept because the user can add a special image, text or symbol on different pieces of the frame. Goal 2 is achieved by changing the form of the smartphone to balance the temperature when it is exposed to extreme heat. A frame with small squeezable units will circulate air and cool down the battery within the phone and as a result, cool down the whole device. This design feature helps the battery last longer and consume less energy during usage. After a while, squeezing the phone becomes a habit for the user, resulting in the user becoming more attached to the product. Goal 3 is reached by changing the physical form of the phone by using durable materials. Shatterproof materials in the frame prevent damage if the phone is dropped and using slip proof or easy to grip materials on the frame will prevent the phone from being dropped.

Because both aspects of how people think have been addressed, the redesigned smartphone results in a product that can potentially last longer and uses less energy. For example, by allowing the user to personalize the phone with an image (Goal 1) and using slip proof, durable materials (Goal 3) will prevent damage or dropping and extend the life of the product. Goal 2 designs such as squeezing and cooling down the device and educating the user how to charge properly will result in the battery from overheating and increase product lifespan. Goal 4 prevents the packaging from being disposed and need to purchase a new mailing box. It also makes it more convenient for the user to recycle the smartphone.

The environmental benefits of this design are estimated using a life cycle approach. Assuming that we could extend the product life by up to one year and reduce its annual electricity consumption by 20% applying these changes, the resultant benefits are estimated to reduce the annualized smartphone cumulative energy by 25%.

Although some elements and features of this disclosure are described in specific combinations or might seem complimentary to each other, one skillful in the art knows that each element or feature can be utilized alone or in a different combination with others. In addition, the methods described above may be used by any other consumer electronics devices.

What is claimed is:

1. An anti-loss protection system for producing a notification when the loss of an object is imminent, said system comprising:
   a plurality of beacons, each comprising at least one antenna and each adapted to transmit at least one radio frequency (RF) signal via said at least one antenna of said plurality of beacons, wherein said plurality of beacons are configured to be attached to the object; and
   a mobile device comprising at least one antenna and said mobile device is configured to receive the at least one transmitted RF signal from each of said plurality of beacons via said at least one antenna of said mobile device and said mobile device is configured to estimate a distance between the object and said mobile device based on at least two received signal strength indicators (RSSI) of the at least one transmitted RF signal from at least two of said plurality of beacons measured at said at least one antenna of the mobile device; and
   wherein the mobile device uses a combination of said at least two received signal strength indicators to increase the accuracy of said distance estimation in order to mitigate the destructive effect of RF fading on such an estimation; and
   wherein said mobile device is not aware of the location of said plurality of beacons; and
   wherein said mobile device is configured to produce a notification when said distance exceeds a threshold.

2. The system of claim 1,
   Wherein the maximum of said two RSSIs is used to estimate the distance between the object and said mobile device.

3. The system of claim 1, further comprising at least one speaker functionally couple to said mobile device, wherein said at least one speaker is configured to selectively generate an alarm.

4. The system of claim 3, wherein the alarm sound gets softer as the beacons get closer to the mobile device.

5. The system of claim 1, wherein at least one of said plurality of beacons comprises a low energy Bluetooth RF tag.

6. The system of claim 1, wherein at least one of said plurality of beacons is configured to periodically transmit on a configurable wakeup cycle.

7. The system of claim 1, wherein said mobile device is a smartphone.

8. An anti-loss protection system for producing a notification when the loss of an object is imminent, said system comprising:
- a plurality of beacons, each adapted to transmit at least one radio frequency (RF) signal, wherein said plurality of beacons are configured to be attached to the object; and
- a mobile device comprising at least one antenna and configured to receive the at least one transmitted RF signal from each of said plurality of beacons via at least one antenna of the mobile device; and
- wherein the mobile device measures received signal strength from each of said signal transmitted from each of said plurality of beacons at the at least one antenna of the mobile device, and calculates a corresponding RSSI value for each of said transmitted signal from each of said plurality of beacons; and
- wherein the mobile device combines at least two of said calculated RSSI values corresponding to said plurality of beacons to derive a reference RSSI; and
- wherein the mobile device is configured to
- estimate a distance between the object and said mobile device based on said derived reference RSSI to increase the accuracy of distance estimation in order to mitigate the destructive effect of RF fading on such an estimation; and
- wherein said mobile device is not aware of the location of said plurality of beacons; and
- wherein said mobile device is configured to produce a notification when said distance exceeds a threshold.

9. The system of claim 8, wherein at least one of said plurality of beacons further comprises a plurality of antennas and each antenna adapted to transmit one RF signal; and
- wherein said mobile device calculate an RSSI for each signal path between each of said transmitting antenna and said at least one antenna of the mobile device; and
- wherein the mobile device combinedly use at least two of said calculated RSSIs from said plurality of antennas attached to said at least one of said plurality of beacons to increase the accuracy of said distance estimation by mitigating the effect of RF fading on such an estimation.

10. The system of claim 9, wherein said mobile device further comprises a plurality of antennas; and
- wherein said mobile device calculates an RSSI value for each signal path between each of said transmitting antennas attached to each of said plurality of beacons and each of said receiving antennas attached to said mobile device; and
- wherein the mobile device combines at least two of the said calculated RSSI values to derive a reference RSSI; and
- wherein the mobile device use said derived reference RSSI for distance estimation in order to mitigate the effect of RF fading on accuracy of such an estimation.

11. The system of claim 10, wherein the mobile device evaluates the relative position of said object with respect to itself based on RSSIs of a plurality of signals transmitted from said plurality of transmitting antennas of said at least one of said plurality of beacons towards said plurality of antennas of the mobile device.

* * * * *